United States Patent

[11] 3,616,365

[72] Inventors Fritz Stastny
 Ludwigshafen (Rhine);
 Rudolf Gaeth, Limburgerhof/Pfalz; Hans-Georg Trieschmann,
 Hambach/Weinstrasse, all of Germany
[21] Appl. No. 860,107
[22] Filed Sept. 22, 1969
[45] Patented Oct. 26, 1971
[73] Assignee Badische Anilin & Soda Fabrik Aktiengesellschaft
 Ludwigshafen/Rhineland Pfalz, Germany
[32] Priority May 27, 1966
[33] Germany
[31] P 16 69 649.4
 Continuation of application Ser. No. 640,509, May 23, 1967, now abandoned.

[54] PROCESS OF MAKING PARTICULATE EXPANDED OLEFIN POLYMERS HAVING HIGH THERMAL STABILITY
 5 Claims, No Drawings
[52] U.S. Cl. ..................................................204/159.14,
 260/2.5 B, 260/2.5 R, 204/159.2
[51] Int. Cl. ........................................................ B01j 1/10,
 C08j 1/30
[50] Field of Search ............................................ 260/2.5 E,
 2.51; 204/159.14, 159.2

[56] References Cited
 UNITED STATES PATENTS

| | | | |
|---|---|---|---|
| 2,948,664 | 8/1960 | Rubens et al. | 204/159.2 |
| 2,952,593 | 9/1960 | Rubens | 204/159.2 |
| 2,983,692 | 5/1961 | D'Alelio | 260/2.5 B |
| 3,098,831 | 7/1963 | Carr | 260/2.5 |
| 2,966,469 | 12/1960 | Smythe et al. | 260/2.5 |

Primary Examiner—Samuel H. Blech
Assistant Examiner—Morton Foelak
Attorney—Johnston, Root, O'Keefe, Keil, Thompson & Shurtleff ABSTRACT: Particulate expanded ethylene or propylene polymers having a particle diameter of 3 to 50 mm. and a bulk density of 5 to 200 grams/liter and a gel content of 10 to 85 percent by weight; and a method for the production of such expanded ethylene or propylene polymer particles in which the particles are treated with high energy radiation.

PROCESS OF MAKING PARTICULATE EXPANDED OLEFIN POLYMERS HAVING HIGH THERMAL STABILITY

This application is a continuation of application Ser. No. 640,509, filed May 23, 1967, now abandoned.

The present invention relates to particulate expanded ethylene and propylene polymers having high thermal stability and to a method for their production.

Particulate expanded olefin polymers are of interest for various industrial applications, for example as material for filling cushions, lifebuoys, boat hulls or for pipe shafts in buildings. These particles may be obtained by breaking up larger moldings for example. Methods have also been used in industry in which olefin polymers are mixed with an expanding agent in an extruder, the homogeneous melt is extruded through a die with release of pressure and the extrudate is granulated. The expanded particles of ethylene and propylene polymers have the disadvantage however that they have relatively low thermal stability. Thus for example expanded polyethylene particles cannot be heated above 70° to 80° C. for prolonged periods because the particles shrink or melt so that the foam structure is lost.

We have now found that particulate expanded ethylene and propylene polymers which have high thermal stability are obtained when expanded crystalline ethylene or propylene polymer particles are treated with high-energy radiation.

Ethylene and propylene polymers in accordance with this invention are crystalline olefin polymers whose X-ray crystallinity is more than 25 percent at 25° C. For example homopolymers and copolymers of ethylene or propylene are suitable for the process. Copolymers of ethylene with other ethylenically unsaturated monomers containing at least 50 percent by weight of copolymerized units of ethylene are particularly suitable for the process. Copolymers of ethylene with 5 to 30 percent by weight of esters of acrylic acid or methacrylic acid or vinylcarboxylic acid are especially suitable. n-Butyl acrylate, tert-butyl acrylate and vinyl acetate have special importance among the comonomers.

Expanded olefin polymer particles whose diameter is from 3 to 50 mm., preferably from 5 to 25 mm., may be used for the process according to this invention. Expanded particles (also referred to as foam particles) are particles in which the cell membranes consist of the olefin polymer. It is preferred to use for the process particles having predominantly closed-cell structure. The particles may have a bulk density of from 5 to 200, preferably from 10 to 50, grams/liter. The expanded particles are obtained by conventional industrial methods, for example by mixing the olefin polymer with an expanding agent in an extruder and extruding the mixture through a die, the extrudate containing expanding agent thus obtained being granulated immediately after it leaves the die. It is also possible however to use particles which have been obtained by heating mixtures of olefin polymers and expanding agents which decompose with the formation of gaseous products.

The expanded particles are treated according to this invention with high energy radiation. High energy radiation includes in particular X-rays, electron beams and neutron radiation. Such high energy radiation is sometimes also called ionizing radiation. It is particularly advantageous to use electron radiation produced by means of an electron accelerator because in such a method there is no need for expensive protective installations. So-called "$60_{Co}$ sources" (cobalt–60 sources) may also be used as sources of radiation. It is necessary to treat the particles with a radiation dosage such that the gel content in the particles amounts to 10 to 85 percent by weight, preferably 30 to 80 percent by weight. Gel content is defined as the proportion by weight of the polymer which is insoluble in solvents at temperatures above the crystalline melting point. The gel content may be determined in the case of olefin polymers for example by heating the particles in toluene to temperatures of 100° C., filtering and drying the insoluble fraction. It has been found that the thermal stability is directly proportional to the content of cross-linked components in the polymer. Thus for example particles of a polymer of 83 percent of ethylene and 17 percent of tert-butyl acrylate, which contain 30 percent or 60 percent of gel fraction, may be heated for a long time at temperatures of 90° to 120° C. without the foam structure of the particles being destroyed. When an electron beam is used, these fractions are reached in the expanded particles when the radiation dosage is 5 to 60 megarads, preferably 40 to 60 megarads. 1 megarad (Mrad) is $10^6$ rads; 1 rad is the absorbed energy of 100 ergs per gram.

Suitable methods and apparatus for industrial exploitation of high energy radiation are described for example in the work of D.H. Heinze and E.-G. Hofmann on "Anwendung, Wirtschaftlichkeit and Auswahl von Strahlenquellen" (Use, economy and selection of radiation sources) which appeared in the periodical Kerntechnik—Isotopentechnik und—Chemie, volume 11, Nov. 1961, on pages 475 to 482.

The expanded particles obtained by the process according to this invention have a particularly high thermal stability. The particles may therefore be used with particular advantage as filling for pipe shafts because, for example, steam and hot water pipes heat the pipe shafts to temperatures of 80° to 120° C. so that the use of expanded particles of other thermoplastics have hitherto been excluded for this purpose. The particles may also be used as filling for parts of buildings and for constructional parts which are subjected to high temperatures.

Thus the particles may be used for example as fillers for constructional elements in aircraft.

The invention is further illustrated by the following examples. The parts and percentages specified in the examples are by weight.

EXAMPLE 1

Mixtures of 79 parts of an ethylene polymer, 19 parts of 2,2-dimethylpropane and 2 parts of talc are prepared in a double screw extruder (L/D=25). The temperature is 160° C. in the melting zone and 80° C. in the nozzle. The mixtures are extruded continuously. They expand into strands which are granulated.

If polyethylene is used, particles are obtained having a bulk density of 30 grams/liter. If a copolymer of 75 percent of ethylene and 25 percent of tert-butyl acrylate is used, particles are obtained having a bulk density of 29 grams/liter.

The loose particles are exposed to radiation of 60 Mrad in an electron accelerator. The gel content after this is 84 percent in both cases. The particles now have a thermal stability which is 40° C. above the thermal stability determined on the untreated particles.

EXAMPLE 2

One hundred parts of low-pressure polyethylene in the form of sandlike particles (such as it is obtained by polymerization in the gas phase at 40 atmospheres gauge and 150° C. with a catalyst of $CrO_3$-silicate) having a mean particle size of 0.5 to 3 mm. and a molecular weight of 800,000 is sprayed with a solution of 1 part of di-tert-butyl peroxide and 0.1 part of cobalt naphthenate in light naphtha. The mixture is then heated for a period of 2 hours at 110° C. The polyethylene thus cross-links on the surface of the particles.

One hundred parts of the polyethylene particles treated in this way is mixed in an autoclave with 100 parts of n-butane and heated for a period of 30 minutes at 125° C. while stirring. A homogeneous gel forms within the polyethylene particles without the particles fusing together. The gel particles are decompressed to atmospheric pressure in a cyclone and expand to 50 times their original volume. The pores in the particles have a diameter of from 1 to 10 microns.

The particles thus obtained are subjected to electron radiation of 50 Mrad. After this treatment, the particles have a gel content of 69 percent. The thermal stability is 30° C. above the thermal stability of the untreated particles.

EXAMPLE 3

Expanded particles of 80 percent by weight of polypropylene and 20 percent by weight of polyisobutylene having a molecular weight of 150,000, which have a particle diameter of 5 to 80 mm. and a bulk density of 14 grams/liter, are treated with electron radiation of 40 Mrad. After this treatment the gel content is 52 percent. The particles have a thermal stability of up to 130° C.

EXAMPLE 4

Closed-cell expanded particles of polypropylene having a particle size of 5 to 10 mm. are treated with X-rays to a dosage of 50 Mrad. Particles having a thermal stability which is 10° C. above the thermal stability of the untreated particles are obtained.

We claim:

1. A process for the production of particulate expanded ethylene or propylene polymers which comprises (a) mixing an ethylene or propylene homopolymer or a copolymer of ethylene and other ethylenically unsaturated monomers containing at least 50 percent by weight of ethylene units, said polymer or copolymer having an X-ray crystallinity at 25° C. of more than 25 percent with an expanding agent, (b) expanding and granulating the mixture to form expanded particles having a diameter of from 3 to 50 mm. and a bulk density of from 5 to 200 grams/liter, and (c) subjecting the said expanded particles to high energy radiation until the gel content in the polymer or copolymer amounts to 10 to 85 percent by weight, whereby individual expanded particles are formed having a diameter of from 30 to 50 mm., a bulk density of from 5 to 200 grams/liter and a gel content of from 10 to 85 percent by weight.

2. A process as in claim 1 wherein the particles are homopolymers of ethylene.

3. A process as in claim 1 wherein the particles consist essentially of a copolymer of ethylene with 5 to 30 percent by weight of n-butyl acrylate, tertiary butyl acrylate or vinyl acetate.

4. A process according to claim 1 wherein the dosage of the high-energy radiation is from 5 to 60 Mrad.

5. A process as claimed in claim 1 wherein the particles consist of a copolymer of 95 to 70 percent by weight of ethylene and 5 to 30 percent by weight of esters of acrylic acid, methacrylic acid or vinylcarboxylic acid.

* * * * *